(12) United States Patent
Watanabe

(10) Patent No.: US 11,545,695 B2
(45) Date of Patent: Jan. 3, 2023

(54) ALL-SOLID-STATE BATTERY

(71) Applicant: Toyota Jidosha Kabushiki Kaisha, Toyota (JP)

(72) Inventor: Hideaki Watanabe, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 166 days.

(21) Appl. No.: 17/082,336

(22) Filed: Oct. 28, 2020

(65) Prior Publication Data

US 2021/0135279 A1 May 6, 2021

(30) Foreign Application Priority Data

Nov. 1, 2019 (JP) .............. JP2019-200124

(51) Int. Cl.
  *H01M 10/0562* (2010.01)
  *H01M 10/0525* (2010.01)
  *H01M 4/131* (2010.01)
  *H01M 4/36* (2006.01)
  *H01M 4/134* (2010.01)
  *H01M 4/02* (2006.01)

(52) U.S. Cl.
  CPC ....... *H01M 10/0562* (2013.01); *H01M 4/131* (2013.01); *H01M 4/134* (2013.01); *H01M 4/366* (2013.01); *H01M 10/0525* (2013.01); *H01M 2004/027* (2013.01); *H01M 2004/028* (2013.01)

(58) Field of Classification Search
  None
  See application file for complete search history.

(56) References Cited

U.S. PATENT DOCUMENTS

| 2011/0027661 A1 | 2/2011 | Okazaki et al. |
| 2011/0045348 A1* | 2/2011 | Kubo ............. H01M 10/052 29/623.5 |
| 2015/0024280 A1 | 1/2015 | Uchiyama |

FOREIGN PATENT DOCUMENTS

| JP | 2009-193940 A | 8/2009 |
| JP | 2009-266728 A | 11/2009 |
| WO | 2012160707 A1 | 11/2012 |

* cited by examiner

*Primary Examiner* — Wyatt P McConnell
(74) *Attorney, Agent, or Firm* — Dinsmore & Shohl LLP

(57) ABSTRACT

An all-solid-state battery includes a positive electrode layer, a solid electrolyte layer, and a negative electrode layer. The solid electrolyte layer separates the positive electrode layer from the negative electrode layer. The positive electrode layer includes a positive electrode active material, a conductive material, an oxide-based lithium ion conductor, and a sulfide-based solid electrolyte. A cross section of the positive electrode layer satisfies a relational expression (1): $3\% \leq S_B/S_A \leq 30\%$. In the relational expression (1), "$S_A$" represents a partial area of the oxide-based lithium ion conductor that is in contact with the positive electrode active material, and "$S_B$" represents a partial area of the oxide-based lithium ion conductor that is surrounded by the sulfide-based solid electrolyte.

3 Claims, 2 Drawing Sheets

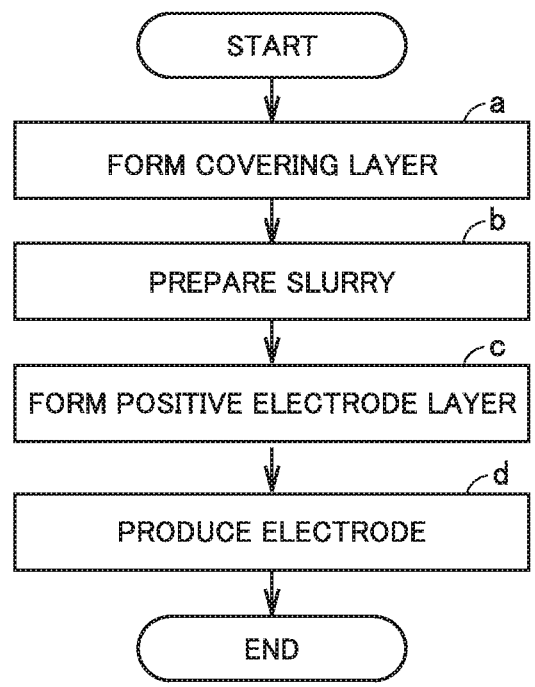

ALL-SOLID-STATE BATTERY

CROSS REFERENCE TO RELATED APPLICATIONS

This nonprovisional application claims priority to Japanese Patent Application No. 2019-200124 filed on Nov. 1, 2019, with the Japan Patent Office, the entire contents of which are hereby incorporated by reference.

BACKGROUND

Field

The present disclosure relates to an all-solid-state battery.

Description of the Background Art

Japanese Patent Laying-Open No. 2009-266728 discloses forming a coat layer for reducing formation of a resistive layer, on a surface of a positive electrode active material.

SUMMARY

Sulfide-based solid electrolyte has been a promising electrolyte for all-solid-state batteries. It is because sulfide-based solid electrolyte has a high lithium (Li) ion conductivity.

However, when a sulfide-based solid electrolyte comes into contact with a positive electrode active material, the sulfide-based solid electrolyte may react with the positive electrode active material. It is probably because of the high electric potential of the positive electrode active material. As a result of the reaction between the sulfide-based solid electrolyte and the positive electrode active material, the interface resistance between the sulfide-based solid electrolyte and the positive electrode active material may increase. This increase in interface resistance may increase battery resistance.

For reducing interface resistance, use of a covering layer has been proposed. More specifically, a positive electrode active material (particles) is covered with an oxide-based Li ion conductor. Thus, a covering layer consisting of the oxide-based Li ion conductor is formed. The covering layer may reduce the number of contacts between the sulfide-based solid electrolyte and the positive electrode active material. As a result, the interface resistance may be reduced. The covering layer is also called a buffer layer or a reaction-reducing layer, for example.

By the way, a positive electrode of an all-solid-state battery is formed by slurry application. More specifically, a positive electrode active material, a sulfide-based solid electrolyte, a conductive material, a dispersion medium, and the like are mixed to prepare a slurry. The resulting slurry is applied to a surface of a base material and dried to form a positive electrode layer. During slurry preparation, a surface of the positive electrode active material is under shearing load. This shearing load can cause detachment of the oxide-based Li ion conductor from the positive electrode active material.

An object of the present disclosure is to reduce battery resistance.

In the following, the technical structure and the effects according to the present disclosure are described. It should be noted that the action mechanism according to the present disclosure includes presumption. The action mechanism does not limit the scope of claims.

[1] An all-solid-state battery includes a positive electrode layer, a solid electrolyte layer, and a negative electrode layer. The solid electrolyte layer separates the positive electrode layer from the negative electrode layer. The positive electrode layer includes a positive electrode active material, a conductive material, an oxide-based lithium ion conductor, and a sulfide-based solid electrolyte.

A cross section of the positive electrode layer satisfies the following relational expression (1):

$$3\% \leq S_B/S_A \leq 30\% \qquad (1).$$

In the relational expression (1), "$S_A$" represents a partial area of the oxide-based lithium ion conductor that is in contact with the positive electrode active material. In the relational expression (1), "$S_B$" represents a partial area of the oxide-based lithium ion conductor that is surrounded by the sulfide-based solid electrolyte.

It is considered that "$S_B/S_A$" in the relational expression (1) represents the ratio of the amount of the oxide-based Li ion conductor detached from the positive electrode active material to the amount of the oxide-based Li ion conductor covering the positive electrode active material. Each of "$S_A$" and "$S_B$" is calculated from results of analysis conducted with an SEM-EDX (scanning electron microscope energy dispersive x-ray micro analyzer).

The present disclosure has newly found that an increase in battery resistance that is conventionally encountered may occur because "$S_B/S_A$" is not set. "$S_B/S_A$" is controllable by adjusting stirring conditions in slurry preparation.

When "$S_B/S_A$" is from 3% to 30%, battery resistance may be reduced. When "$S_B/S_A$" exceeds 30%, battery resistance tends to increase. It may be because the high amount of detached oxide-based Li ion conductor leads to an increased number of contacts between the sulfide-based solid electrolyte and the positive electrode active material and consequently an increased interface resistance.

Reducing the shearing load in slurry preparation may reduce "$S_B/S_A$". The lower the "$S_B/S_A$" is, the lower the battery resistance tends to be. However, when "$S_B/S_A$" is lower than 3%, battery resistance tends to increase instead. It may be because the excessively low shearing load allows for aggregation of the conductive material in the slurry, and the aggregation of the conductive material causes defects in electron conduction paths within the positive electrode layer.

[2] The cross section of the positive electrode layer may further satisfy, for example, the following relational expression (2):

$$S_B/S_C \leq 5\% \qquad (2).$$

In the relational expression (2), "$S_B$" represents a partial area of the oxide-based lithium ion conductor that is surrounded by the sulfide-based solid electrolyte. In the relational expression (2), "$S_C$" represents an entire area of the sulfide-based solid electrolyte.

The Li-ion conductivity of the oxide-based Li ion conductor may be lower than that of the sulfide-based solid electrolyte. In the positive electrode layer, the sulfide-based solid electrolyte may form Li-ion conduction paths. The oxide-based Li ion conductor surrounded by the sulfide-based solid electrolyte may reduce Li-ion conduction within the positive electrode layer.

"$S_B/S_C$" in the relational expression (2) represents the ratio of the area of the oxide-based Li ion conductor that is scattered across the sulfide-based solid electrolyte to the area of the sulfide-based solid electrolyte. The present disclosure has found that when "$S_B/S_C$" is 5% or less, battery resistance tends to be reduced.

[3] The oxide-based lithium ion conductor may include at least one selected from the group consisting of lithium niobium oxide and lithium titanium oxide, for example.

For example, lithium niobium oxide and lithium titanium oxide may have an action of reducing interface resistance.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 is a schematic flowchart of a method of producing an all-solid-state battery according to the present embodiment.

DETAILED DESCRIPTION

In the following, embodiments of the present disclosure (hereinafter also called "present embodiment") are described. However, the description below does not limit the scope of claims.

In the present embodiment, such phrases as "from 1 part by mass to 10 parts by mass" mean a range that includes the boundary values, unless otherwise specified. For example, the phrase "from 1 part by mass to 10 parts by mass" means a range of "not less than 1 part by mass and not more than 10 parts by mass".

<All-Solid-State Battery>

Figure 1:
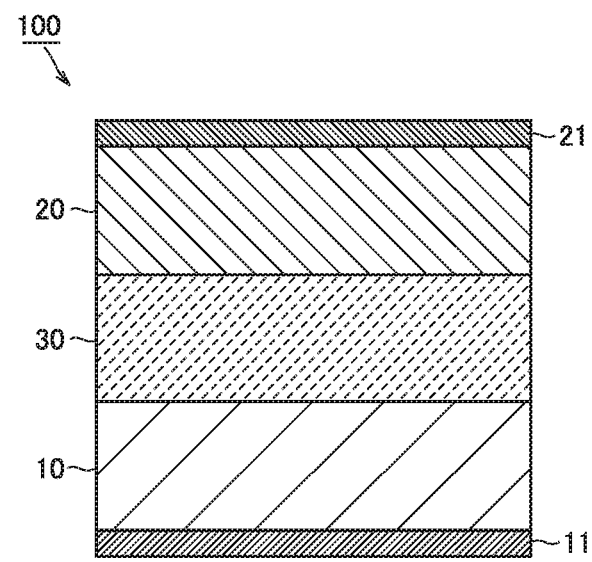
FIG. 1 is a conceptual cross-sectional view of an all-solid-state battery according to the present embodiment.
Figure 1:
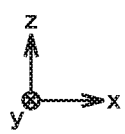

FIG. 1 is a conceptual cross-sectional view of an all-solid-state battery according to the present embodiment.

An all-solid-state battery 100 includes a positive electrode layer 10, a solid electrolyte layer 30, and a negative electrode layer 20. Solid electrolyte layer 30 separates positive electrode layer 10 from negative electrode layer 20. Positive electrode layer 10, solid electrolyte layer 30, and negative electrode layer 20 together may form a unit stacked body. All-solid-state battery 100 may include a single unit stacked body. All-solid-state battery 100 may include a plurality of unit stacked bodies.

All-solid-state battery 100 may include a case (not illustrated). The case may accommodate positive electrode layer 10, solid electrolyte layer 30, and negative electrode layer 20. The case may have any configuration. The case may be a pouch made of an aluminum-laminated film, for example. The case may be a metal casing, for example.

All-solid-state battery 100 may further include a positive electrode current collector 11. Positive electrode current collector 11 may be adhered to positive electrode layer 10. Positive electrode current collector 11 conducts electrons but does not conduct Li ions. Positive electrode current collector 11 may include an aluminum (Al) foil, for example. Positive electrode current collector 11 may consist essentially of an Al foil, for example. Positive electrode current collector 11 may have a thickness from 5 µm to 50 µm, for example.

All-solid-state battery 100 may further include a negative electrode current collector 21. Negative electrode current collector 21 may be adhered to negative electrode layer 20. Negative electrode current collector 21 conducts electrons but does not conduct Li ions. Negative electrode current collector 21 may include a copper (Cu) foil and/or a nickel (Ni) foil, for example. Negative electrode current collector 21 may consist essentially of a Cu foil, for example. Negative electrode current collector 21 may have a thickness from 5 µm to 50 µm, for example.

<<Positive Electrode Layer>>

Positive electrode layer 10 is closely adhered to solid electrolyte layer 30. Positive electrode layer 10 includes a positive electrode active material, a conductive material, an oxide-based Li ion conductor, and a sulfide-based solid electrolyte. Positive electrode layer 10 may further include a binder, for example. Positive electrode layer 10 may have a thickness from 1 µm to 100 µm, for example.

(Positive Electrode Active Material)

The positive electrode active material is in the form of particles (powder). The positive electrode active material may have a $D_{50}$ from 1 µm to 30 µm, for example. The "$D_{50}$" according to the present embodiment refers to a particle size in volume-based particle size distribution at which the cumulative particle volume (accumulated from the side of small sizes) reaches 50% of the total particle volume. The $D_{50}$ may be measured with a laser-diffraction particle size distribution analyzer.

The positive electrode active material occludes and releases Li ions. The electric potential for reaction of the positive electrode active material and Li ions is higher than the electric potential for reaction of the negative electrode active material and Li ions. As long as these conditions are satisfied, the positive electrode active material may include any component. For example, the positive electrode active material may include at least one selected from the group consisting of lithium cobalt oxide, lithium nickel oxide, lithium manganese oxide, lithium nickel cobalt aluminate, lithium nickel cobalt manganese oxide, and lithium iron phosphate.

(Oxide-Based Li Ion Conductor)

Part of the oxide-based Li ion conductor covers the positive electrode active material (particles). Part of the oxide-based Li ion conductor is scattered across the sulfide-based solid electrolyte. The oxide-based Li ion conductor conducts Li ions. The oxide-based Li ion conductor may conduct both Li ions and electrons. The oxide-based Li ion conductor may be synthesized by a sol-gel process, for example.

The oxide-based Li ion conductor covering the positive electrode active material forms a covering layer. The covering layer may be formed by a tumbling fluidized-bed coating technique, for example. The presence of the covering layer may reduce the number of contacts between the positive electrode active material and the sulfide-based solid electrolyte. This may reduce interface resistance. The covering layer may have a thickness from 1 nm to 100 nm, for example. The covering layer may have a thickness from 1 nm to 20 nm, for example.

The oxide-based Li ion conductor may include at least one selected from the group consisting of lithium niobium oxide and lithium titanium oxide, for example.

The "lithium niobium oxide" according to the present embodiment refers to a composite oxide that includes niobium (Nb), oxygen (O), and Li. As long as the lithium niobium oxide includes Nb, O, and Li, the lithium niobium oxide may have any chemical composition. The lithium niobium oxide may include at least one selected from the group consisting of $LiNbO_3$, $Li_2Nb_2O_5$, and $LiNbTiO_3$, for example.

The "lithium titanium oxide" according to the present embodiment refers to a composite oxide that includes titanium (Ti), O, and Li. As long as the lithium titanium oxude includes Ti, O, and Li, the lithium titanium oxide may have any chemical composition. The lithium titanium oxide may include at least one selected from the group consisting of $Li_4Ti_5O_{12}$, $Li_2Ti_2O_5$, $Li_2TiO_3$, and $LiTi_2O_4$, for example.

(Sulfide-Based Solid Electrolyte)

The sulfide-based solid electrolyte is in the form of particles. The sulfide-based solid electrolyte may have a $D_{50}$ from 0.1 μm to 5 μm, for example. The sulfide-based solid electrolyte may have a $D_{50}$ from 0.8 μm to 2.5 μm, for example.

The sulfide-based solid electrolyte conducts Li ions. The sulfide-based solid electrolyte does not conduct electrons. In positive electrode layer 10, the sulfide-based solid electrolyte forms Li-ion conduction paths. The amount of the sulfide-based solid electrolyte may be determined so as to provide a good balance between the Li-ion conduction paths and the positive electrode capacity. The sulfide-based solid electrolyte and the positive electrode active material may satisfy the following relation, for example: "(positive electrode active material)/(sulfide-based solid electrolyte)=60/40 to 80/20" (volume ratio). The sulfide-based solid electrolyte and the positive electrode active material may satisfy the following relation, for example: "(positive electrode active material)/(sulfide-based solid electrolyte)=60/40 to 70/30" (volume ratio). The sulfide-based solid electrolyte and the positive electrode active material may satisfy the following relation, for example: "(positive electrode active material)/(sulfide-based solid electrolyte)=70/30 to 80/20" (volume ratio).

The sulfide-based solid electrolyte may be glass, for example. The sulfide-based solid electrolyte may be glass ceramics (also called "crystallized glass"), for example.

The sulfide-based solid electrolyte includes sulfur (S) and Li. The sulfide-based solid electrolyte may further include phosphorus (P), for example. The sulfide-based solid electrolyte may further include a halogen element, for example. The sulfide-based solid electrolyte may further include iodine (I) and/or bromine (Br), for example. The sulfide-based solid electrolyte may further include 0, silicon (Si), germanium (Ge), and/or tin (Sn), for example.

The sulfide-based solid electrolyte may include at least one selected from the group consisting of $Li_2S$—$P_2S_5$, $Li_2S$—$Si_2$, LiI—$Li_2S$—$Si_2$, LiI—$Si_2S$—$P_2S_5$, LiI—LiBr—$Li_2S$—$P_2S_5$, LiI—$Li_2S$—$P_2S_5$, LiI—$Li_2O$—$Li_2S$—$P_2S_5$, LiI—$Li_2S$—$P_2O_5$, LiI—$Li_3PO_4$—$P_2S_5$, and $Li_2S$—$P_2S_5$—$GeS_2$, for example. These materials thus listed may be commonly included in positive electrode layer 10, solid electrolyte layer 30, and negative electrode layer 20.

For example, "$Li_2S$—$P_2S_5$" means that the sulfide-based solid electrolyte consists of a component derived from $Li_2S$ and a component derived from $P_2S_5$. $Li_2S$—$P_2S_5$ may be produced by mechanochemical reaction of $Li_2S$ and $P_2S_5$, for example. In particular, a sulfide-based solid electrolyte that includes a component derived from $Li_2S$ and a component derived from $P_2S_5$ is also called "$Li_2S$—$P_2S_5$-type solid electrolyte". The mixing ratio between $Li_2S$ and $P_2S_5$ is not limited. $Li_2S$ and $P_2S_5$ may satisfy the following relation, for example: "$Li_2S/P_2S_5$=50/50 to 90/10" (molar ratio). $Li_2S$ and $P_2S_5$ may satisfy the following relation, for example: "$Li_2S/P_2S_5$=60/40 to 80/20" (molar ratio).

(Conductive Material)

Within positive electrode layer 10, the conductive material forms electron conduction paths. The amount of the conductive material may be, for example, from 0.1 parts by mass to 10 parts by mass relative to 100 parts by mass of the positive electrode active material. The conductive material may include any component. The conductive material may include at least one selected from the group consisting of graphite, carbon black, vapor grown carbon fiber (VGCF), carbon nanotube (CNT), and graphene flake, for example.

(Binder)

The binder combines the components of positive electrode layer 10 together. The amount of the binder may be, for example, from 0.1 parts by mass to 10 parts by mass relative to 100 parts by mass of the positive electrode active material. The binder may include any component. The binder may include at least one selected from the group consisting of polyvinylidene difluoride (PVdF), polytetrafluoroethylene (PTFE), butyl rubber, styrene-butadiene rubber (SBR), polyacrylic acid (PAA), and carboxymethylcellulose (CMC), for example.

(Cross Section of Positive Electrode Layer)

According to the present embodiment, the amount of detachment of the oxide-based Li ion conductor (covering layer) is controlled. As a result, all-solid-state battery 100 may have a low battery resistance.

Figure 2:
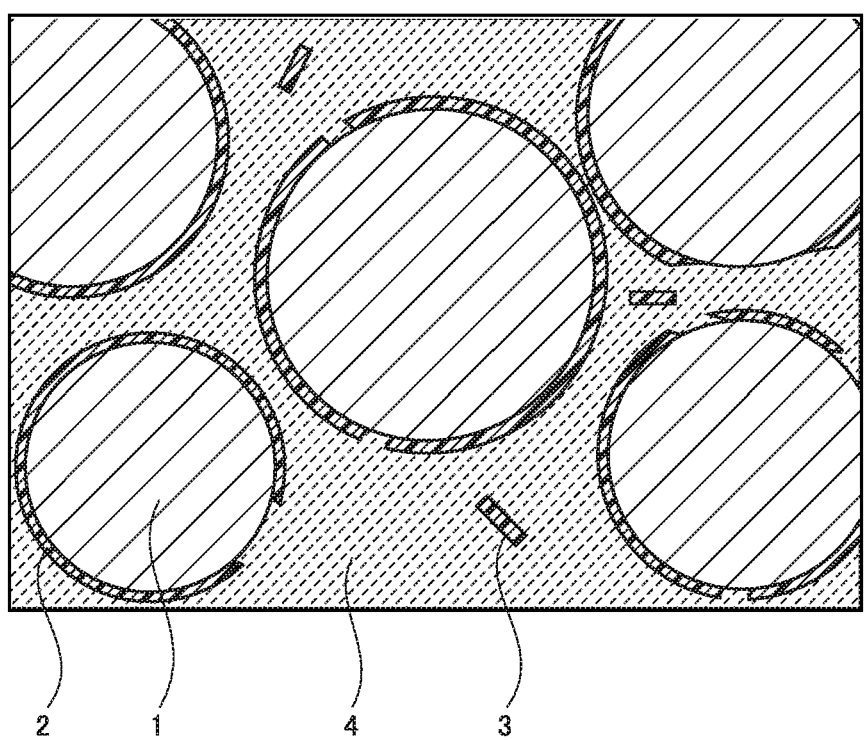
FIG. 2 is a conceptual cross-sectional view of a positive electrode layer according to the present embodiment.

FIG. 2 is a conceptual cross-sectional view of the positive electrode layer according to the present embodiment.

A cross section of positive electrode layer 10 includes a positive electrode active material 1, a covering layer 2, an educt 3, a conductive material (not illustrated), and a sulfide-based solid electrolyte 4. Each of covering layer 2 and educt 3 consists essentially of the oxide-based Li ion conductor. It is considered that educt 3 is a part of covering layer 2 detached from positive electrode active material 1 during the process for forming positive electrode layer 10. For example, a shearing load applied during slurry preparation may cause detachment of covering layer 2.

At a part of a surface of positive electrode active material 1 that is not covered with covering layer 2, positive electrode active material 1 may be in contact with sulfide-based solid electrolyte 4. This may increase interface resistance. This increase in interface resistance may increase battery resistance.

A cross section of positive electrode layer 10 according to the present embodiment satisfies the following relational expression (1):

$$3\% \leq S_B/S_A \leq 30\% \qquad (1).$$

When the relational expression (1) is satisfied, battery resistance may be reduced. In the relational expression (1), "$S_A$" represents a partial area of the oxide-based Li ion conductor that is in contact with positive electrode active material 1. The part of the oxide-based Li ion conductor that is in contact with positive electrode active material 1 corresponds to covering layer 2 in FIG. 2. According to the present embodiment, a part of the oxide-based Li ion conductor not surrounded by sulfide-based solid electrolyte 4 is regarded as being in contact with positive electrode active material 1.

In the relational expression (1), "$S_B$" represents a partial area of the oxide-based Li ion conductor that is surrounded by sulfide-based solid electrolyte 4. A part of the oxide-based Li ion conductor that is surrounded by sulfide-based solid electrolyte 4 corresponds to educt 3 in FIG. 2.

"$S_B/S_A$" is a measure of the amount of detached oxide-based Li ion conductor. When "$S_B/S_A$" exceeds 30%, interface resistance may increase, leading to an increase in battery resistance. The lower the "$S_B/S_A$" is, the lower the amount of detachment is and thereby the lower the interface resistance may be. However, when "$S_B/S_A$" is lower than 3%, battery resistance tends to increase instead. It may be because the excessively low shearing load during slurry preparation allows for aggregation of the conductive material in the slurry, and the aggregation of the conductive material causes defects in electron conduction paths within positive electrode layer 10.

"$S_B/S_A$" may be 28% or less, for example. "$S_B/S_A$" may be 27% or less, for example. "$S_B/S_A$" may be 12% or more, for example. "$S_B/S_A$" may be 13% or more, for example.

The cross section of positive electrode layer 10 according to the present embodiment may further satisfy the following relational expression (2):

$$S_B/S_C \leq 5\% \tag{2}.$$

"$S_B$" in the relational expression (2) is the same as "$S_B$" in the relational expression (1). "$S_C$" represents an entire area of sulfide-based solid electrolyte 4.

Educt 3 in FIG. 2 is surrounded by sulfide-based solid electrolyte 4. Educt 3 may reduce ionic conduction in sulfide-based solid electrolyte 4. When the relational expression (2) is satisfied, ionic conduction in sulfide-based solid electrolyte 4 may be promoted. As a result, battery resistance may be reduced.

"$S_B/S_C$" may be 4% or less, for example. "$S_B/S_C$" may be 2% or less, for example. "$S_B/S_C$" may be 0.5% or more, for example. "$S_B/S_C$" may be 1% or more, for example.

(Measurement Method)

"$S_A$", "$S_B$", and "$S_C$" in the relational expressions (1) and (2) are calculated from results of analysis conducted with an SEM-EDX.

Positive electrode layer 10 is cut so as to prepare a cross-sectional sample of positive electrode layer 10. The cross section is any cross section. The cross section is not necessarily parallel to a particular direction. The cross-sectional sample is subjected to CP (cross section polisher) or FIB (focused ion beam) machining.

After the cross section machining, an SEM image of the cross-sectional sample is captured. The magnification for the image is adjusted so that the SEM image includes 5 to 10 particles of the positive electrode active material. An EDX is operated to perform elemental mapping.

For example, when the positive electrode active material is lithium nickel cobalt manganese oxide, elemental mapping of Ni, Co, and Mn is carried out.

For example, when the oxide-based Li ion conductor is lithium niobium oxide, elemental mapping of Nb is carried out. For example, when the oxide-based Li ion conductor is lithium titanium oxide, elemental mapping of Ti is carried out.

For example, when the sulfide-based solid electrolyte is a $Li_2S$—$P_2S_5$-type solid electrolyte, elemental mapping of S and P is carried out.

The SEM image is compared with the EDX elemental mapping image to identify pixels belonging to the positive electrode active material, pixels belonging to the oxide-based Li ion conductor, and pixels belonging to the sulfide-based solid electrolyte within the SEM image. Pixel identification may be performed by using image analysis software.

The pixels belonging to the oxide-based Li ion conductor that are in contact with the positive electrode active material are counted. The total number of such pixels is regarded as "$S_A$". Pixel counting may be performed by using image analysis software.

The pixels belonging to the oxide-based Li ion conductor that are surrounded by the sulfide-based solid electrolyte are counted. The total number of such pixels is regarded as "$S_B$".

$S_B$ is divided by $S_A$ to obtain "$S_B/S_A$". $S_B/S_A$ is expressed in percentage. $S_B/S_A$ in percentage is rounded to the nearest integer.

The pixels belonging to the sulfide-based solid electrolyte are counted. The total number of such pixels is regarded as "$S_C$". $S_B$ is divided by $S_C$ to obtain "$S_B/S_C$". $S_B/S_C$ is expressed in percentage. $S_B/S_C$ in percentage is rounded to the nearest integer.

From positive electrode layer 10, five cross-sectional samples are taken. These five cross-sectional samples are taken at substantially regular intervals. The interval may be 10% to 20% of the maximum width of positive electrode layer 10. The "maximum width" refers to the distance between two points that are farthest away from each other on the outer circumference of positive electrode layer 10 in a plan view of positive electrode layer 10. For each of these five cross-sectional samples, "$S_B/S_A$" is calculated. The arithmetic mean of the resulting five "$S_B/S_A$" values is regarded as "$S_B/S_A$" of positive electrode layer 10 of interest. The same applies to "$S_B/S_C$".

<<Solid Electrolyte Layer>>

Solid electrolyte layer 30 is interposed between positive electrode layer 10 and negative electrode layer 20. Solid electrolyte layer 30 includes a sulfide-based solid electrolyte. Solid electrolyte layer 30 may consist essentially of a sulfide-based solid electrolyte. Solid electrolyte layer 30 may further include a binder, for example. Solid electrolyte layer 30 may have a thickness from 1 µm to 100 µm, for example.

The sulfide-based solid electrolyte of solid electrolyte layer 30 may be the same as that of positive electrode layer 10. The sulfide-based solid electrolyte of solid electrolyte layer 30 may be different from that of positive electrode layer 10.

The amount of the binder may be, for example, from 0.1 parts by volume to 10 parts by volume relative to 100 parts by volume of the sulfide-based solid electrolyte. The binder may include any component. The binder may include butyl rubber, for example.

<<Negative Electrode Layer>>

Negative electrode layer 20 is closely adhered to solid electrolyte layer 30. Negative electrode layer 20 includes a negative electrode active material and a sulfide-based solid electrolyte. Negative electrode layer 20 may further include a binder, for example. Negative electrode layer 20 may have a thickness from 1 µm to 100 µm, for example.

The negative electrode active material occludes and releases Li ions. The negative electrode active material may include any component. The negative electrode active material may include at least one selected from the group consisting of graphite, soft carbon, hard carbon, Si, SiO, Si-based alloy, Sn, SnO, Sn-based alloy, Li-based alloy, Li, and lithium titanium oxide, for example.

The sulfide-based solid electrolyte of negative electrode layer 20 may be the same as that of positive electrode layer 10. The sulfide-based solid electrolyte of negative electrode layer 20 may be different from that of positive electrode layer 10.

The amount of the binder may be, for example, from 0.1 parts by mass to 10 parts by mass relative to 100 parts by mass of the negative electrode active material. The binder may include any component. The binder may include PVdF, for example.

<Method of Producing All-Solid-State Battery>

FIG. 3 is a schematic flowchart of a method of producing an all-solid-state battery according to the present embodiment.

According to the present embodiment, a method of producing an all-solid-state battery is also provided.

The method of producing an all-solid-state battery according to the present embodiment includes (a) to (d) below:

(a) forming a covering layer on a surface of a positive electrode active material by covering the positive electrode active material with an oxide-based Li ion conductor;

(b) after the covering layer is formed, preparing a slurry by mixing the positive electrode active material, a sulfide-based solid electrolyte, a conductive material, and a dispersion medium;

(c) forming a positive electrode layer by applying the slurry to a surface of a base material and drying; and (d) producing an all-solid-state battery including the positive electrode layer.

The positive electrode layer is formed so that a cross section of the positive electrode layer satisfies the relational expression (1).

The positive electrode layer may be formed so that the cross section of the positive electrode layer further satisfies the relational expression (2).

EXAMPLES

Next, examples according to the present disclosure (herein also called "the present example") are described. However, the description below does not limit the scope of claims.

<Producing All-Solid-State Battery>

A battery for evaluation (all-solid-state battery) was produced in the below-described manner.

Comparative Example 1

(Preparing Precursor Solution)

Lithium ethoxide by 1 mmol, pentaethoxyniobium by 1 mmol, and ethanol were mixed to prepare a precursor solution. The precursor solution included a precursor of oxide-based Li ion conductor.

(Forming Covering Layer)

As a positive electrode active material, lithium nickel cobalt manganese oxide (NCM) powder was prepared. A tumbling fluid bed apparatus "MP-01" manufactured by Powrex Corporation was used to mix the positive electrode active material and the precursor solution. The resulting mixture was dried. After drying, the mixture was calcined at 200° C. for 5 hours.

In this way, a covering layer was formed on a surface of the positive electrode active material. The covering layer included an oxide-based Li ion conductor ($LiNbO_3$). The thickness of the covering layer was 10 nm.

(Forming Positive Electrode Layer)

The materials described below were prepared.

Sulfide-based solid electrolyte: LiI—$Li_2S$—$P_2S_5$ glass ceramics ($D_{50}$=0.8 μm)

Conductive material: VGCF

Binder solution: PVdF (5 mass %) as solute, butyl butyrate as solvent

Dispersion medium: butyl butyrate

A thin-film spin system high-speed mixer "FILMIX (registered trademark), Model 30-L" manufactured by PRIMIX Corporation (hereinafter simply called "mixer") was prepared. Into the stirring vessel of the mixer, the sulfide-based solid electrolyte, the conductive material, the binder solution, and the dispersion medium were added to prepare a mixture. The mixer was operated at a rotational speed of 20000 rpm for 30 minutes to stir the mixture. Into the stirring vessel, the positive electrode active material (covered) was further added. The amount of the positive electrode active material thus added was adjusted so as to satisfy "(positive electrode active material)/(sulfide-based solid electrolyte) =70/30" (volume ratio). After the positive electrode active material was added, the mixer was operated at a rotational speed of 20000 rpm for 60 minutes to stir the mixture. Thus, a slurry was prepared.

As a positive electrode current collector, an Al foil was prepared. A doctor blade applicator was used to apply the slurry to a surface of the Al foil. After application, the slurry was air-dried. Thus, a positive electrode layer was formed. The resulting positive electrode layer was further dried on a hot plate at 100° C. for 30 minutes.

(Forming Negative Electrode Layer)

The materials described below were prepared.

Negative electrode active material: lithium titanium oxide

Sulfide-based solid electrolyte: LiI—$Li_2S$—$P_2S_5$ glass ceramics ($D_{50}$=0.8 μm)

Binder solution: PVdF (5 mass %) as solute, butyl butyrate as solvent

Dispersion medium: butyl butyrate

A polypropylene (PP) container was prepared. Into the PP container, the negative electrode active material, the sulfide-based solid electrolyte, the binder solution, and the dispersion medium were added to prepare a mixture. An ultrasonic disperser "UH-50" manufactured by SMT Co., Ltd. was used to stir the mixture in the PP container for 30 seconds. A shaker "TTM-1" manufactured by Sibata Scientific Technology Ltd. was used to shake the PP container containing the mixture for 30 minutes. Thus, a slurry was prepared.

As a negative electrode current collector, a Cu foil was prepared. A doctor blade applicator was used to apply the slurry to a surface of the Cu foil. After application, the slurry was air-dried. Thus, a negative electrode layer was formed. The resulting negative electrode layer was further dried on a hot plate at 100° C. for 30 minutes.

(Forming Solid Electrolyte Layer)

The materials described below were prepared.

Sulfide-based solid electrolyte: LiI—$Li_2S$—$P_2S_5$ glass ceramics ($D_{50}$=2.5 μm)

Binder solution: butyl rubber (5 mass %) as solute, heptane as solvent

Dispersion medium: heptane

Into a PP container, the sulfide-based solid electrolyte, the binder solution, and heptane were added to prepare a mixture. An ultrasonic disperser "UH-50" manufactured by SMT Co., Ltd. was used to stir the mixture in the PP container for 30 seconds. A shaker "TTM-1" manufactured by Sibata Scientific Technology Ltd. was used to shake the PP container containing the mixture for 30 minutes. Thus, a slurry was prepared.

A doctor blade applicator was used to apply the slurry to a surface of the Al foil. After application, the slurry was air-dried. Thus, a solid electrolyte layer was formed. The resulting solid electrolyte layer was further dried on a hot plate at 100° C. for 30 minutes.

(Producing Battery for Evaluation)

A mold was prepared. In the mold, the solid electrolyte layer was placed. A pressure of 1 ton/$cm^2$ was applied to press the solid electrolyte layer. Then, on a surface of the solid electrolyte layer, the positive electrode layer was positioned. A pressure of 1 ton/$cm^2$ was applied to press the positive electrode layer and the solid electrolyte layer together. Then, on a surface of the solid electrolyte layer opposite to the positive electrode layer, the negative electrode layer was positioned. A pressure of 6 ton/$cm^2$ was applied to press the negative electrode layer, the solid electrolyte layer, and the positive electrode layer together. In this way, a battery for evaluation was produced. The resulting battery for evaluation had an electrode area of 1 cm².

Comparative Example 2>

After the positive electrode active material was added, the mixer was operated at a rotational speed of 20000 rpm for 30 minutes to stir the mixture to prepare a slurry. Except this, the same manner as in Comparative Example 1 was adopted to produce a battery for evaluation.

Comparative Example 3>

After the positive electrode active material was added, the mixer was operated at a rotational speed of 10000 rpm for 10 minutes to stir the mixture to prepare a slurry. Except this, the same manner as in Comparative Example 1 was adopted to produce a battery for evaluation.

Comparative Example 4

(Preparing Precursor Solution)
Lithium ethoxide by 1 mmol, titanium tetraisopropoxide by 1 mmol, and ethanol were mixed to prepare a precursor solution. The precursor solution included a precursor of oxide-based Li ion conductor.
(Forming Covering Layer)
A tumbling fluid bed apparatus "MP-01" manufactured by Powrex Corporation was used to mix the positive electrode active material and the precursor solution. The resulting mixture was dried. After drying, the mixture was calcined at 300° C. for 5 hours.

In this way, a covering layer was formed on a surface of the positive electrode active material. The covering layer included an oxide-based Li ion conductor ($Li_2Ti_2O_5$). The thickness of the covering layer was 10 nm. Except these, the same manner as in Comparative Example 1 was adopted to produce a battery for evaluation.

Example 1

After the positive electrode active material was added, the mixer was operated at a rotational speed of 15000 rpm for 60 minutes to stir the mixture to prepare a slurry. Except this, the same manner as in Comparative Example 1 was adopted to produce a battery for evaluation.

Example 2

After the positive electrode active material was added, the mixer was operated at a rotational speed of 15000 rpm for 30 minutes to stir the mixture to prepare a slurry. Except this, the same manner as in Comparative Example 1 was adopted to produce a battery for evaluation.

Example 3

After the positive electrode active material was added, the mixer was operated at a rotational speed of 15000 rpm for 10 minutes to stir the mixture to prepare a slurry. Except this, the same manner as in Comparative Example 1 was adopted to produce a battery for evaluation.

Example 4

After the positive electrode active material was added, the mixer was operated at a rotational speed of 15000 rpm for 60 minutes to stir the mixture to prepare a slurry. Except this, the same manner as in Comparative Example 4 was adopted to produce a battery for evaluation.

Example 5

The amount of the positive electrode active material added was adjusted so that "(positive electrode active material)/(sulfide-based solid electrolyte)=80/20" (volume ratio) was satisfied. After the positive electrode active material was added, the mixer was operated at a rotational speed of 15000 rpm for 30 minutes to stir the mixture. Thus, a slurry was prepared. Except these, the same manner as in Comparative Example 1 was adopted to produce a battery for evaluation.

Example 6>

The amount of the positive electrode active material added was adjusted so that "(positive electrode active material)/(sulfide-based solid electrolyte)=60/40" (volume ratio) was satisfied. After the positive electrode active material was added, the mixer was operated at a rotational speed of 15000 rpm for 30 minutes to stir the mixture. Thus, a slurry was prepared. Except these, the same manner as in Comparative Example 1 was adopted to produce a battery for evaluation.

<Evaluation>

<<SEM-EDX>>

According to the above-described measurement method, "$S_B/S_A$" and "$S_B/S_C$" were measured. Results are shown in Table 1 below.

<<Resistance Measurement>>

Resistance of the battery for evaluation was measured in the below manner.

First, constant current-constant voltage charging and constant-current discharging were carried out to measure the capacity of the battery for evaluation. The rate for the charging and the discharging was 1/3 C. At a rate of 1 C, the battery for evaluation is fully discharged from its full charge capacity in one hour.

The SOC (state of charge) of the battery for evaluation was adjusted to 50%. In an environment at a temperature of 25° C., the battery for evaluation was discharged at a rate of 3 C for 10 seconds. During discharging, the voltage was measured. The voltage sampling rate was 0.1 second. From the level of voltage drop at 0.1 second from the start of discharging, the resistance for a lapse of 0.1 second from the start of discharging (0 second) was calculated. Results are shown under column "Resistance for 0-0.1 sec." of Table 1. There seems to be a correlation between the "Resistance for 0-0.1 sec." and the interface resistance between the positive electrode active material and the sulfide-based solid electrolyte.

Further, from the level of voltage drop measured between 0.1 second and 10 seconds, the resistance for the time period between 0.1 second and 10 seconds was also calculated. Results are shown under column "Resistance for 0.1-10 sec." of Table 1. There seems to be a correlation between the "Resistance for 0.1-10 sec." and the ionic conduction resistance within positive electrode layer 10.

TABLE 1

| | Positive electrode layer | | | | Evaluation | |
|---|---|---|---|---|---|---|
| | Oxide-based Li ion conductor | (Positive electrode active material)/ (sulfide-based solid electrolyte) [volume ratio] | $S_B/S_A$ [%] | $S_B/S_C$ [%] | Resistance for 0-0.1 sec. [Ω] | Resistance for 0.1-10 sec. [Ω] |
| Comp. Ex. 1 | Lithium niobium oxide | 70/30 | 64 | 16 | 52 | 25 |
| Comp. Ex. 2 | Lithium niobium oxide | 70/30 | 37 | 8 | 28 | 20 |
| Comp. Ex. 3 | Lithium niobium oxide | 70/30 | 1 | 0.4 | 32 | 22 |
| Comp. Ex. 4 | Lithium titanium oxide | 70/30 | 44 | 12 | 48 | 24 |
| Ex. 1 | Lithium niobium oxide | 70/30 | 30 | 5 | 15 | 8 |
| Ex. 2 | Lithium niobium oxide | 70/30 | 12 | 1 | 12 | 10 |
| Ex. 3 | Lithium niobium oxide | 70/30 | 3 | 0.5 | 10 | 9 |
| Ex. 4 | Lithium titanium oxide | 70/30 | 28 | 4 | 14 | 9 |
| Ex. 5 | Lithium niobium oxide | 80/20 | 13 | 2 | 15 | 12 |
| Ex. 6 | Lithium niobium oxide | 60/40 | 27 | 5 | 12 | 7 |

Results

Comparative Example 1, Comparative Example 2

As illustrated in Table 1, when "$S_B/S_A$" exceeds 30%, the "Resistance for 0-0.1 sec." tends to be noticeably increased. It is considered that the amount of the oxide-based Li ion conductor detached from the positive electrode active material was high and thereby the positive electrode active material reacted with the sulfide-based solid electrolyte to increase the interface resistance.

Comparative Example 3

When "$S_B/S_A$" is lower than 3%, resistance tends to be increased. It is considered that the conductive material was not sufficiently dispersed and thereby defects were caused in electron conduction paths within the positive electrode layer.

Example 1, Example 2, Example 3

When "$S_B/S_A$" is from 3% to 30%, resistance tends to be low. It is considered that the amount of the oxide-based Li ion conductor detached from the positive electrode active material was low and the conductive material was dispersed well. Also when "$S_B/S_C$" is 5% or less, resistance tends to be low.

Example 4, Comparative Example 4

Regardless of the type of the oxide-based Li ion conductor, when "$S_B/S_A$" is from 3% to 30%, resistance tends to be low.

Example 5, Example 6

Regardless of the volume ratio between the positive electrode active material and the sulfide-based solid electrolyte, when "$S_B/S_A$" is from 3% to 30%, resistance tends to be low.

The present embodiments and the present examples are illustrative in any respect. The present embodiments and the present examples are non-restrictive. The technical scope defined by the terms of the claims encompasses any modifications within the meaning and the scope equivalent to the terms of the claims.

What is claimed is:

1. An all-solid-state battery, comprising:
a positive electrode layer;
a solid electrolyte layer; and
a negative electrode layer,
the solid electrolyte layer separating the positive electrode layer from the negative electrode layer,
the positive electrode layer including a positive electrode active material, a conductive material, an oxide-based lithium ion conductor, and a sulfide-based solid electrolyte,
a cross section of the positive electrode layer satisfying the following relational expression (1):

$$0.03\% \leq S_B/S_A \leq 0.3 \tag{1}$$

wherein
$S_A$ represents a partial area of the oxide-based lithium ion conductor that is in contact with the positive electrode active material, and
$S_B$ represents a partial area of the oxide-based lithium ion conductor that is surrounded by the sulfide-based solid electrolyte.

2. The all-solid-state battery according to claim 1, wherein the cross section of the positive electrode layer further satisfies the following relational expression (2):

$$S_B/S_C \leq 0.05 \tag{2}$$

where
$S_B$ represents a partial area of the oxide-based lithium ion conductor that is surrounded by the sulfide-based solid electrolyte, and
$S_C$ represents an entire area of the sulfide-based solid electrolyte.

3. The all-solid-state battery according to claim 1, wherein the oxide-based lithium ion conductor includes at least one selected from the group consisting of lithium niobium oxide and lithium titanium oxide.

\* \* \* \* \*